(12) United States Patent
Masters et al.

(10) Patent No.: US 11,754,437 B2
(45) Date of Patent: Sep. 12, 2023

(54) MEASURING DEFLECTION TO DETERMINE A DYNAMIC CHARACTERISTIC OF A CANTILEVER

(71) Applicant: United States of America as Represented by The Secretary of the Army, Alexandria, VA (US)

(72) Inventors: Benjamin C Masters, Urbana, IL (US); Rebekah C Wilson, Mahomet, IL (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 53 days.

(21) Appl. No.: 16/588,943

(22) Filed: Sep. 30, 2019

(65) Prior Publication Data

US 2021/0096019 A1    Apr. 1, 2021

(51) Int. Cl.
*G01H 9/00*    (2006.01)

(52) U.S. Cl.
CPC ...................... *G01H 9/00* (2013.01)

(58) Field of Classification Search
CPC ........................................................ G01H 9/00
See application file for complete search history.

(56) References Cited

U.S. PATENT DOCUMENTS

| | | | | |
|---|---|---|---|---|
| 2008/0173104 A1* | 7/2008 | German | ............ | G01N 3/30 73/862.381 |
| 2008/0245135 A1* | 10/2008 | Aubin | ............ | G01N 29/022 73/61.49 |
| 2009/0207404 A1* | 8/2009 | Tamayo De Miguel | ............ | G01Q 70/06 356/237.2 |
| 2015/0000402 A1* | 1/2015 | Russo | ............ | G01H 9/00 73/504.12 |
| 2015/0219537 A1* | 8/2015 | Haehner | ............ | B81C 99/003 702/43 |

OTHER PUBLICATIONS

Whitney, Scott. "Vibration of Cantilever Beams: Deflection, Frequency, and Research Uses." Mechanical & Material Engineering: Support for Engineering Mechanics Courses, Apr. 23, 1999, http://emweb.unl.edu/Mechanics-Pages/Scott-Whitney/325hweb/Beams.htm. (Year: 1999).*

* cited by examiner

*Primary Examiner* — Kristina M Deherrera
*Assistant Examiner* — Jean F Morello
(74) *Attorney, Agent, or Firm* — Brian C. Jones (57) ABSTRACT

Disclosed are methods that, by not physically touching the material being measured, can measure the material's differential, response quite accurately. A collimated light shines on the material under test, is reflected off it, and is then captured by a recording device. The position where the reflected light is captured is used to calculate the deflection of the material. Dynamic characteristics of the material under test may be determined from the deflection measurement. The vibration frequency or vibration amplitude of a cantilever can be determined by repeated deflection measurements, all without physically touching the cantilever during the measurement process.

16 Claims, 11 Drawing Sheets

314: Calculate additional vibration frequencies of the cantilever.

316: Use the calculated vibration frequency to determine a characteristic related to the cantilever.

MEASURING DEFLECTION TO DETERMINE A DYNAMIC CHARACTERISTIC OF A CANTILEVER

FEDERALLY SPONSORED RESEARCH OR DEVELOPMENT

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

CROSS-REFERENCE TO RELATED APPLICATIONS

The present application is related to U.S. Patent Applications (Ser. No. 16/588,185, Ser. No. 16/588,710), which are incorporated herein in their entirety by reference.

BACKGROUND

Field of the Invention

The present disclosure is related generally to metrology and, more particularly, to precision measurement of physical properties.

Description of the Related Art

This section introduces aspects that may help facilitate a better understanding of the invention. Accordingly, the statements of this section are to be read in this light and are not to be understood as admissions about what is prior art or what is not prior art.

Many machine parts are crafted from a single material, such as a machine screw made of steel. However, in some circumstances, the properties desired for the part are achieved by combining, often by layering, multiple materials of differing physical characteristics into the resultant part. As a much simplified example, car body panels are often made of steel which has many useful properties, including strength and ductility, but steel is susceptible to rust. To make a useful body panel, the steel is covered with a layer of primer and a layer of paint that together shield the steel from environmental oxygen and thus prevent rust. None of the layers by itself provides ail of the panel's desired characteristics, but each adds its own bane al characteristics to the complete body panel Layering materials introduces new concerns, however. In many cases, the different materials in adjacent layers react differently to environment factors such as temperature. As, for example, different materials in the layers expand and contract differently over time, the result can be paint flaking off an external structure, such as a steel highway bridge. In some cases, the manufacturing process of combining layers of different materials produces stress in the completed part. Consider a bare aluminum sheet to which is added a layer of liquid paint. The paint tends to shrink (or in some cases to expand) as it cures, and, because the paint layer adheres to the aluminum layer, the curing process introduces stress into the aluminum that may warp and weaken the finished product.

The differential responses of the layers are sometimes used to good effect as when two layers of different metals are combined to make a bi-metallic strip. Due to the different properties of the two metals, the bi-metallic strip curves in a well defined manner when the temperature changes. This property of the strips has long been used in mechanical thermometers and thermostats.

BRIEF SUMMARY

The differential responses of the layers in a multi-layered material can be very important even when these responses are quite small. Difficulties arise when trying to measure these small responses, because the response to be measured can be overwhelmed by extraneous forces introduced in the measuring process, extraneous forces such as gravity and stresses introduced by the measuring process itself. Methods are here described that, by not physically touching the material being measured, can measure the differential response quite accurately.

A collimated light shines on the material under test, is reflected off it, and is then captured by a recording device. The position where the reflected light is captured is used to calculate the deflection of the material.

Dynamic characteristics of the material under test may be determined from the deflection measurement. The vibration frequency and vibration amplitude of a cantilever can be determined by repeated deflection measurements, all without physically touching the cantilever during the measurement process.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the" are intended to include the plural forms as well, unless the context clearly indicates otherwise. It further will be understood that the terms "comprises," "comprising," "includes," and "including" specify the presence of stated features, steps, or components but do not preclude the presence or addition of one or more other features, steps, or components.

It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

Figure 1A:
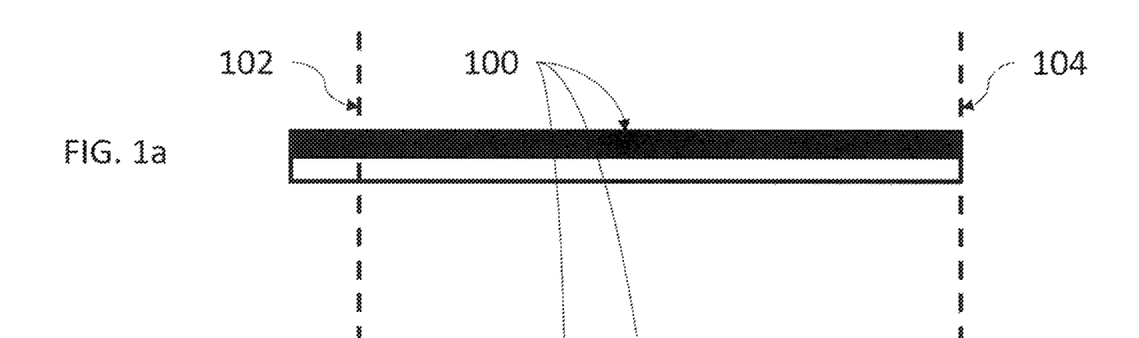
FIGS. 1a, 1b, 1c, and 1d are simple side- and end-views of layered-material strip.

The strip 100 is depicted in FIG. 1a as having two layers, one shown in black, the other in white, and the two layers may be of different compositions. For example, the "layered-material" strip 100 may be a bi-metallic strip with one layer of steel and the other layer of brass. In another example, one layer is aluminum, and the other layer is a coating of paint applied to the aluminum.

Other phrases used for the strip 100 include "cantilever," "coupon," "target," and "material under test."

While layered-material strips are discussed throughout this application, and are often discussed as having exactly two layers, some aspects of the present invention apply to strips composed of a single material or that have more than two layers.

The strip 100 is cantilevered, that is to say, it is supported at only one end. When the strip 100 is clamped in place at point 102, the portion of the strip 100 depicted in FIG. 1a to the left of 102 cannot move, but the portion to the right of that point 102, called the free end 104, is free to move.

Figures 1B, 1C:
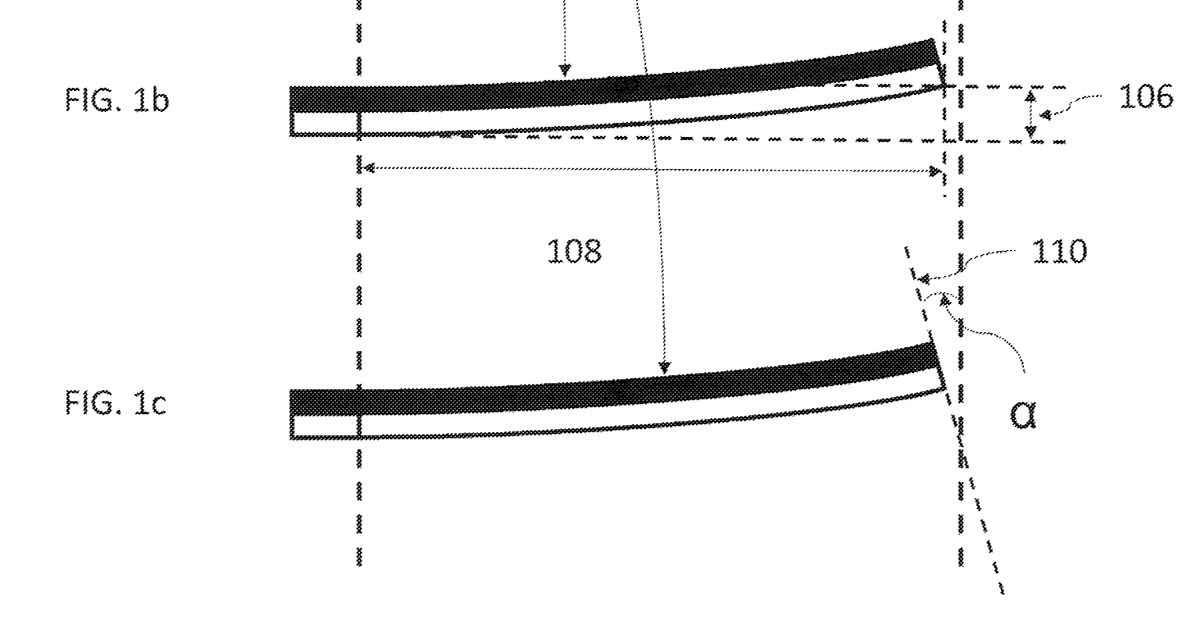

While the strip 100 is flat in FIG. 1a, the free end 104 noticeably curves up in FIG. 1b. There are many possible forces that could lead to such curving. A bi-metallic strip 100 may curve in a well defined manner as the temperature changes due to the different characteristics of the two layers in the strip 100. In another example, a newly applied paint layer (here, the black upper layer) may shrink as it cures, and that shrinkage may pull the underlying substrate (here the lower white layer) into a curve.

The curvature can even be dynamic, as when the cantilevered strip 100 is set to vibrating. In that case, generally speaking, the strip 100 curves up and then down symmetrically around the flat position shown in FIG. 1a, the vibration occurring at a frequency characteristic of the strip 100.

There are two interdependent aspects of the curvature of the strip 100. In FIG. 1b, the curvature's deflection amount 106 is measured at a distance 108 from the clamping point 102. While for clarity's sake the deflection 106 is shown as measured at the free end 104 of the strip 100 in FIG. 1b, there is nothing special about this choice: The curvature can be characterized knowing the deflection 106 at any distance 108 from the clamping point 102.

While the deflection 106 is shown as measured from the "bottom" of the strip 100 in FIG. 1b, it could just as easily be measured from the top, the two measurements being interchangeable as long as the strip 100 does not change in thickness as it curves.

FIG. 1c illustrates another aspect of the curvature of the strip 100. In the flat strip of FIG. 1a, the normal to the surface of the strip 100 is the line 104. However, when the strip 100 curves, the curvature changes the position of the surface of the strip 100, and that changes the normal taken at the endpoint of the strip 100 from the line 104 to the line 110. The "tilt" angle between the flat-strip normal 104 and the curved-strip normal 110 is denoted as α. Small-angle approximations show that:

$$\tan(\alpha) \approx 2 * \text{deflection } 106/\text{distance } 108 \quad \text{Equation 1}$$

Note that the normal line 110 and thus the angle α are different for each point along the curved strip 100. Note also that the curvature and thus the angle α are enlarged for clarity's sake: In a real world situation, it would be unlikely that they would be as large as shown in FIG. 1c.

Figure 1D:
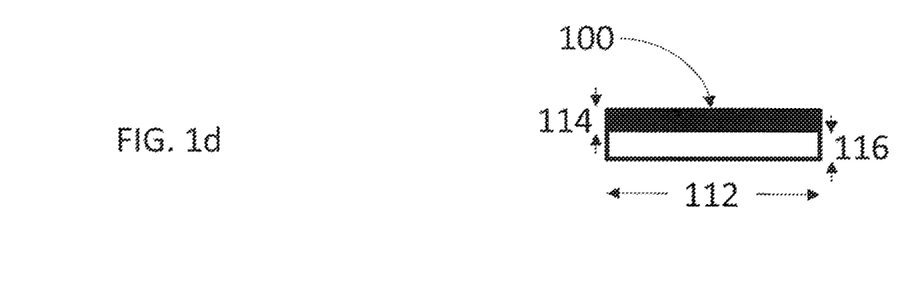

FIG. 1d is an end-view of the strip 100. The strip 100 is shown with a constant width 112, the top layer has a constant thickness 114; and the bottom layer has a constant thickness 116. The two thicknesses 114, 116 can be very different from one another. Most often in this discussion, the strip 100 has a constant width 112 throughout its length, and the layers have constant thicknesses 114, 116. Some aspects of the present disclosure apply to strips 100 whose width 112 or layer thicknesses 114, 116 are not constant.

A representative system 200 for determining a characteristic of the strip 100 is shown in FIGS. 2a through 2e. The view of the representative system 200 in FIGS. 2a through 2e is from above, that is to say, gravity pulls downward into the page.

For purposes of clarity in this discussion, sonic reference numericals in FIGS. 2a through 2e include a suffix "a,""b," etc., when they refer to one specific figure but lack the suffix when they refer to all of the figures in general. For example, the strip is numbered "100a" in FIGS. 2a and "100b" in FIG. 2b but simply "100" in the present discussion when no distinction is being drawn among the figures.

Figure 2A:
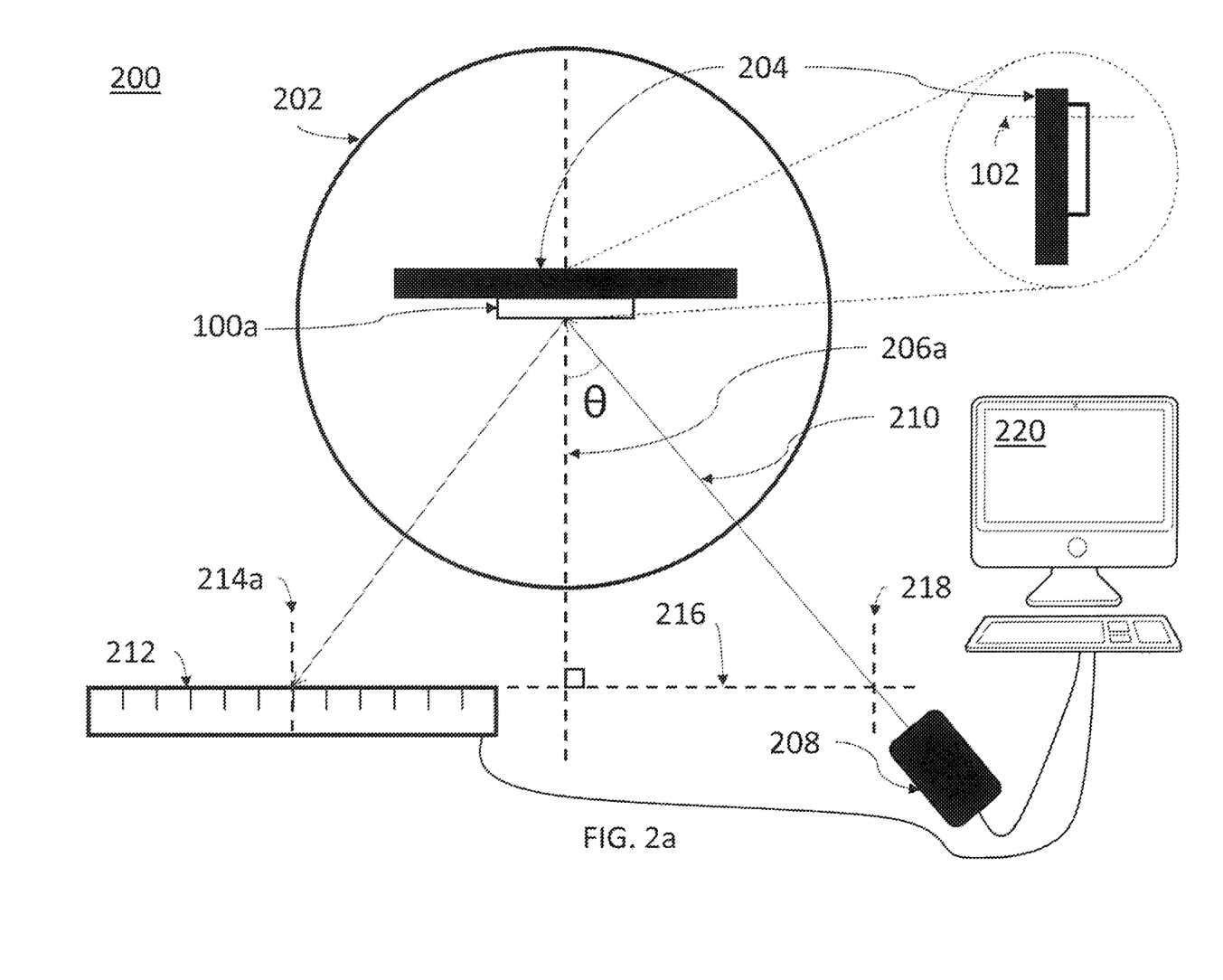
FIGS. 2a and 2b are schematics of a system for measuring deflection, the system using a "top-clamp" mount.

The components of the system 200 are organized around a platform 202. In some embodiments, the platform 202 is an optical table or a rotating platform supported by an optical table. On the platform 202 is a mount 204 that holds the strip 100. To make the geometry easier, some embodiments allow the incident surface of the strip 100 to be placed in the center of the platform 202. In some situations, it is important that the strip 100 be removable from the mount 204 and later replaceable on the mount 204, with the location of the strip 100 on the mount 204 substantially reproducible. In some embodiments, this property is satisfied by using a kinematic or gimbal mount 204.

Figure 2B:
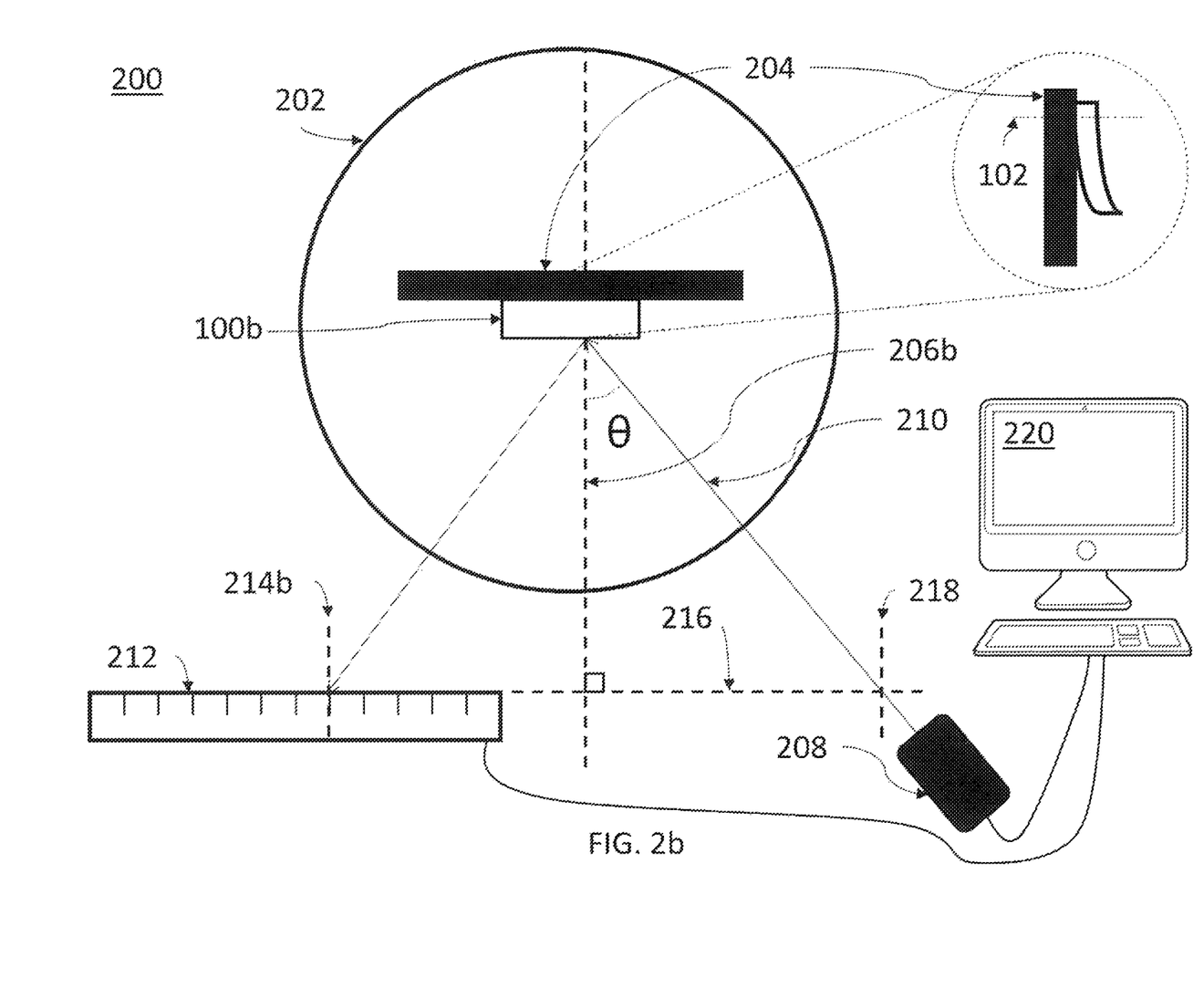

In the embodiment of FIGS. 2a an 2b, the strip 100 is clamped on its top. This is illustrated by the inset drawing on the top right of these figures. In the inset, top is toward the top of the page (unlike in the overall drawing). The clamping point is shown at 102, and the portion of the strip 100 below the clamping point 102 is free to move.

The "normal" to the surface of the strip 100a taken at the point of light incidence (see discussion of 210 below) is denoted by the dotted line 206a. As discussed below, in some situations this line is not exactly normal but is within a very small angle to the normal.

A source of collimated light (e.g. laser) 208 directs light 210 to the strip 100a. The directed light 210 hits the strip 100a at an angle θ to the normal 206a. In some embodiments, the angle θ is adjustable by decreasing the distance of 208 and 212 from 100b. In any case, the angle θ is a known quantity, possibly read off a gauge attached to the platform 202.

The directed light 210 reflects off the strip 100a according to the well known property: "The angle of reflection [θ] is equal to the angle of incidence [θ]." Sometimes, it is useful to increase the reflectivity of the strip 100 by putting a piece of thin, highly reflective material (not shown) or by polishing part of the surface at the point of incidence. The reflected light 210 is then received at a position-sensitive light detector 212 which reports the position 214a where the reflected light 210 is received.

To explain the geometry as simply as possible, a horizontal dotted "baseline" 216 is drawn in FIG. 2a perpendicular to the normal line 206a. In FIG. 2, the baseline 216 is drawn coincident with the light-detection surface of the position-sensitive light detector 212, and the light source 208 is shown "below" the baseline 216. These choices are made purely for illustrative purposes and in no way constrain the actual implementation of the stem 200.

Generally speaking, FIG. 2a illustrates the set-up for the strip 100a at its midpoint or "rest" position. In this simple case, because the strip 100a is flat, the position of the received light 214a is exactly the same distance (to the left in FIG. 2a) from the normal line 206a as the distance from the normal line 206a to the place (on the right) where the collimated light 210 originally crosses the baseline 216 line at position 218.

Many embodiments of the system 200 include a computer 220 that controls the operation of the system 200 or that at the very least receives results. The lines between the computer 220 and the light source 208 and between the computer 220 and the position-sensitive light detector 212 indicate these control and data-capture functions.

In various embodiments, the computer 220 is also configured for performing computations associated with determining characteristics of the strip 100. For example, the computer 220 may use the inputs of the angle θ and outputs 214 of the position-sensitive light detector 212 to calculate a deflection 106 in the strip 100b (see FIGS. 1b and 2b). It may then use that deflection 106 as an input into calculating a characteristic of the strip 100b. With multiple outputs 214 from the position-sensitive light detector 212, the computer 220 may create a plot of deflection 106 vs. time. These and other services performed by the computer 220 are discussed in greater detail below.

To avoid clutter, some optional aspects of the system 200 are not shown. The system 200 can be made more complicated by adding environmental sensors such as a clock, thermometer, hygrometer, etc. The outputs of these sensors could be directed to the computer 220. For example, the computer 220 could record when a specific measurement is made either by timing the operation of the light source 208 or by timing the reception of position data 214 from the position-sensitive light detector 212. The system 200 could also include environmental control systems such as a heater/air conditioner to set the temperature of the strip 100 during measurement.

Because for many embodiments an accurate determination of the position of light reception 214 is a key to accurately determining a characteristic of the strip 100, the entire system 200 can be placed in a light box to shield it from extraneous light. Similarly, the measurements made by the system 200 are often very small, so the entire system 200 can be vibration-isolated from the rest of the world.

FIG. 2b depicts the situation of the strip 100b when not at its midpoint or rest position. Comparing FIG. 2b to FIG. 2a, the fundamental change is in the physical configuration of the strip 100b. Rather than being flat, the strip 100b has deflected a small amount 106 (see FIG. 1b and the inset to FIG. 2b). As discussed above, different circumstances lead to different causes for such a deflection 106. A vibrating strip 100b, for example, would deflect in one direction, pass through its midpoint position as shown by the strip 100a in FIG. 2a, then deflect in the other direction (not shown), cycling through these positions at the strips characteristic vibration frequency.

in any case, if the strip 100b is deflected toward the baseline 216 as shown in the inset to FIG. 2b, then the directed collimated light 210 hits the strip 100b a little "lower" (with respect to the orientation of FIG. 2b) than it does in the configuration of FIG. 2a. (Note that the deflection 106 depicted in FIG. 2b is greatly exaggerated for illustration's sake: Actual deflections are expected to be much smaller.)

While the incident angle θ is unchanged from FIG. 2a to FIG. 2b, the deflection of, the strip 100b toward the baseline 216 moves the normal line at the point of light incidence 206b to the right (as compared with the normal line 206a of FIG. 2a) and changes the light-reception position to 214b (also moved slightly to the right of FIG. 2a's 214a).

(Note that the deflection 106 of the strip 100b also moves the light-reception position slightly "upward and out of the page" of FIG. 2b. This tiny effect is generally not important as it does not affect the light-reception position 214b. If it were to become important, then the mount 204 would allow the strip 100b to be tilted slightly "downward and into the page" of FIG. 2b to cancel the effect before taking the measurement 214b.)

Further details of these geometric changes and their significance are discussed below in relation to step 418 of FIG. 4b.

Figure 2C:
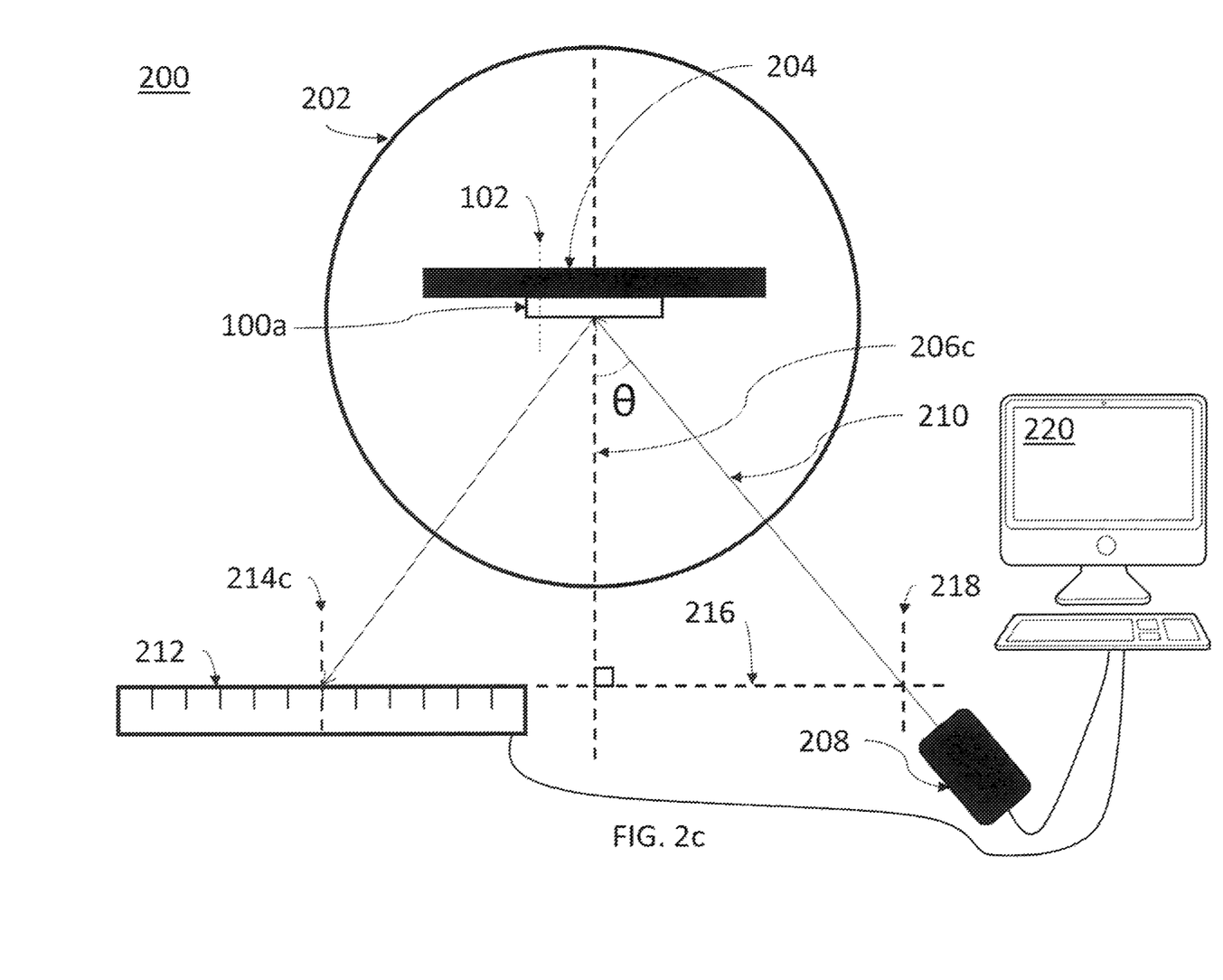
FIGS. 2c through 2e are schematics the same system as in FIGS. 2a and 2b but using a "side-clamp" mount.

The system 200 of FIG. 2c is the same as that of FIG. 2a, but here a side clamp is used instead of a top clamp. The portion of the strip 100a to the right of the clamping point 102 is free to move. Because the strip 100a is flat in FIG. 2c, the geometry is the same as that of FIG. 2a, that is, incident angle θ, normal 206c, and light-reception position 214c are all the same as their counterparts in FIG. 2a.

Figure 2D:
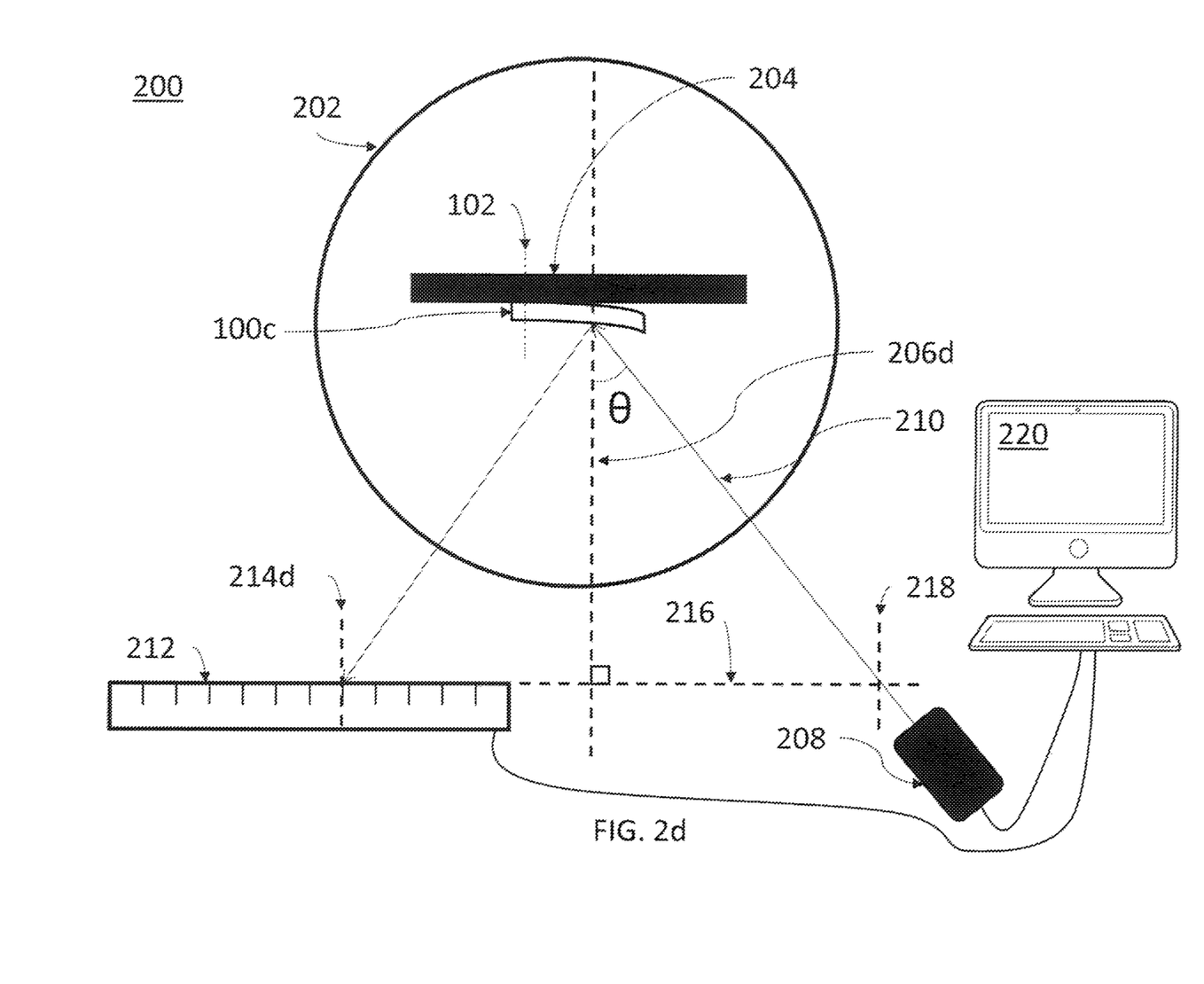
Figure 2E:
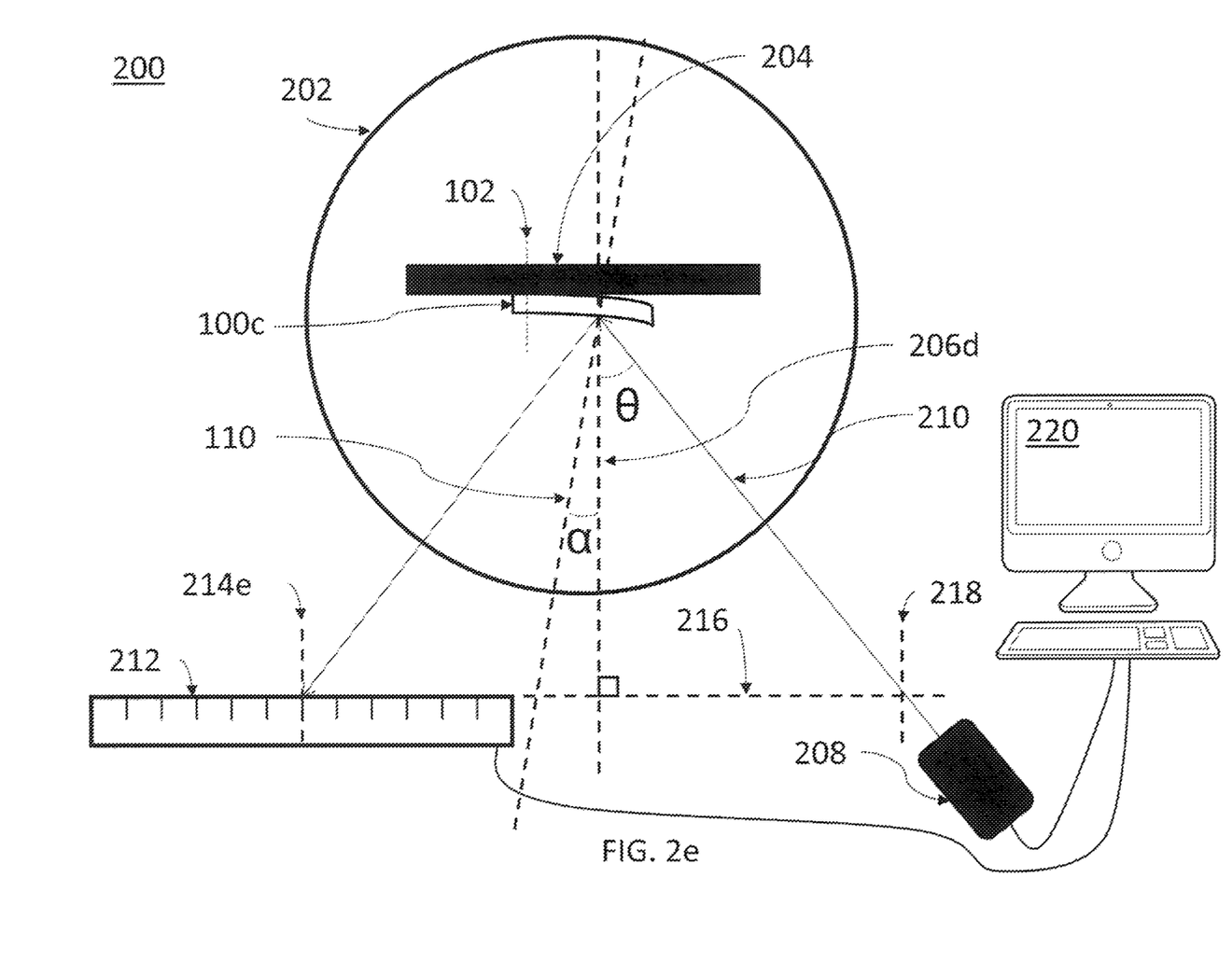

In FIGS. 2d and 2e, the strip 100a at the midpoint position has become the deflected strip 100c with a deflection 106. Because of the side-clamping arrangement, this changes the geometry in two ways. These two changes are here discussed separately, but they are in actuality inseparable.

FIG. 2d emphasizes only the first change. This first change mimics the change in geometry from FIG. 2a to FIG. 2b, that is, the deflection 106 moves the light-incident point of the strip 100c closer to the baseline 216. This in turn moves both the "quasi-normal" 206d and the light-reception location 214d to the right when compared with their positions in FIG. 2c. The line 206d is called "quasi-normal" because, as shown just below, it is not actually normal to the target 100c: The actual normal 110 is tilted by the angle α from the quasi-normal line 206d.

FIG. 2e adds in the second change. The deflection in the strip 100c changes the normal 110 to the surface of the strip 100c slightly (see also FIG. 1c). In consequence, the directed light 210 is actually hitting the strip 100c at an angle θ+α which is slightly greater than the θ of FIG. 2c. The new normal line 110 actually angles slightly down and to the left and is not strictly perpendicular to the baseline 216. This is a very small effect for most deflection measurements and can often be ignored. However, the effect of this small-angle change due to the deflection is discussed below in relation to step 418 of FIG. 4b as part of the mathematics of interpreting results to calculate a vibration amplitude of the strip 100c.

Figure 3A:
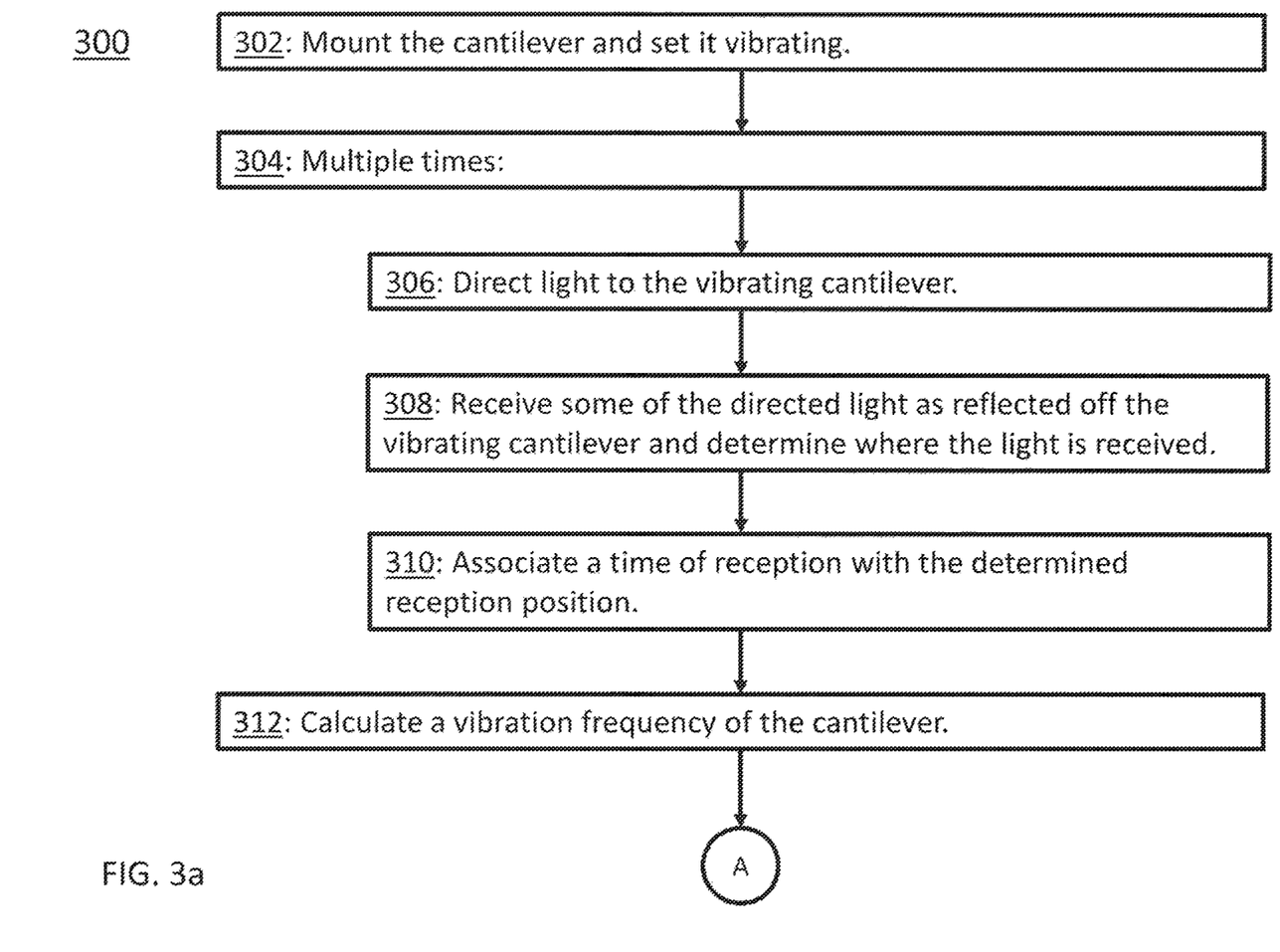
FIGS. 3a and 3b together form a flowchart of method for measuring a vibration frequency of a cantilever.
Figure 3B:
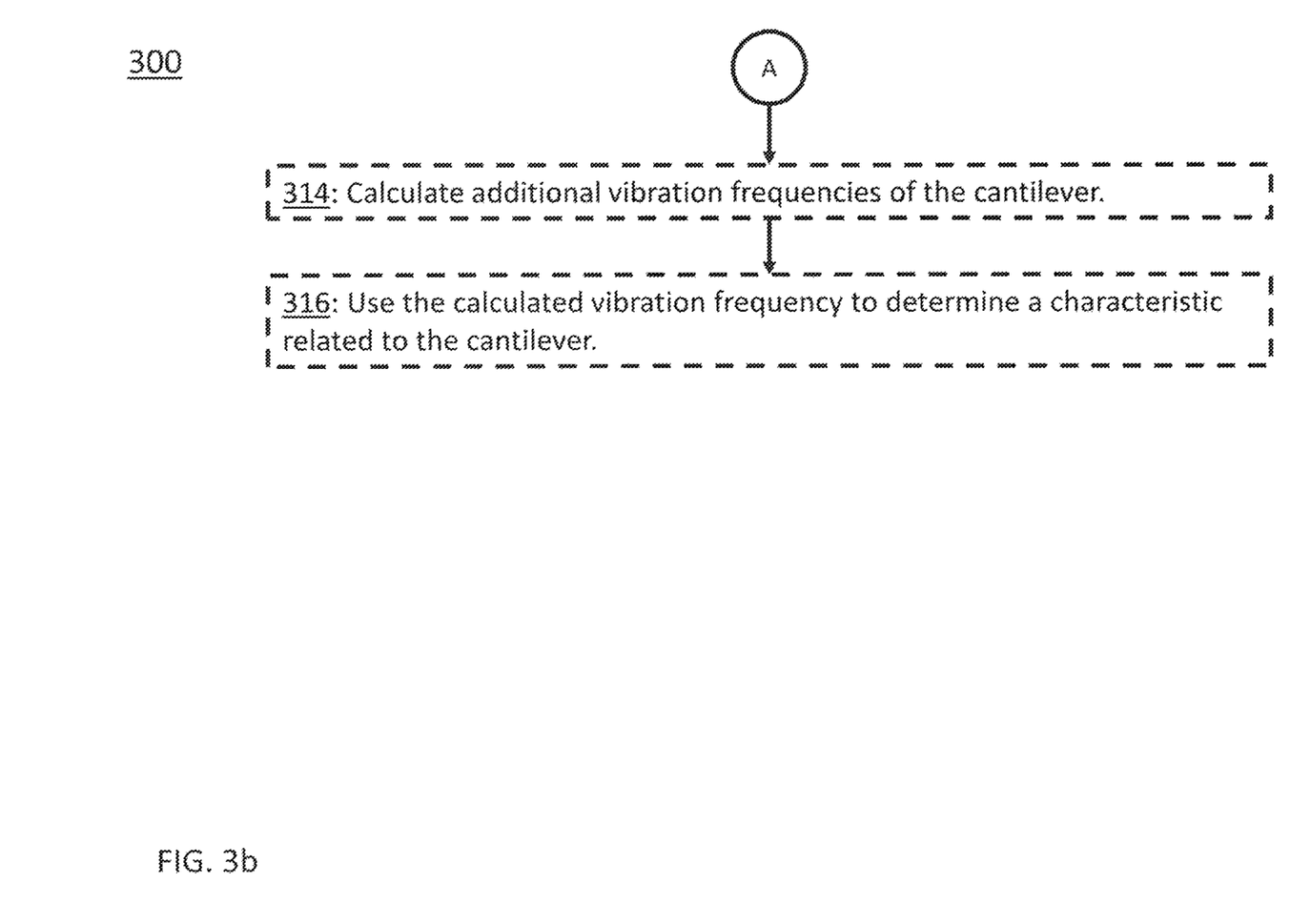

The flowchart of FIGS. 3a and 3b presents one method 300 for applying the techniques of the present disclosure. While the method 300 is discussed here with respect to the representative system 200 of FIGS. 2a through 2e, the method 300 and the system 200 are not dependent upon one another. This particular method 300 calculates a vibration frequency of the cantilevered strip 100.

In step 302, the cantilever 100 is attached to the mount 204 and set to vibrating.

As step 304 indicates, the following steps 306 through 310 are performed multiple times. Possibly under the control of the computer 220, the laser (or other light source) 208 directs collimated light 210 toward the vibrating cantilever 100 in step 306. Some of the directed light 210 is reflected off the vibrating cantilever 100 in step 308 and hits the position-sensitive light detector 212 which records the position of light reception 214. Step 310 associates a time of light reception with each position of light reception.

As the loop of step 304 continues, the computer 220 accumulates a number of paired (reception location 214, reception timing) data points. In step 312, the computer 220 uses those data points to extract the vibration frequency of the cantilever 100. If, for example, the reception location 214 achieves a maximum value, then decreases to a minimum value, then increases back to the maximum value, over and over again, with a repeatable time difference of two seconds from one maximum to the next, then clearly the cantilever 100 is vibrating at 30 times per minute.

Note that while step 312 is shown after the loop of step 304, in some embodiments, the computer 220 constantly calculates and displays the vibration frequency while the cantilever 100 is still vibrating.

In some embodiments, the computer 220 in optional step 314 of FIG. 3b extracts further vibration frequencies from the data, possibly by applying Fast Fourier Transforms.

Note that angle θ (see FIG. 2a) need not be measured in the method 300 of FIGS. 3a and 3b because the actual deflection 106 need not be calculated in order to derive the characteristic vibration frequency of the cantilever 100. This is very different from the case where vibration amplitude is calculated, as discussed below.

After calculating the one or more vibration frequencies, those frequencies can be used in optional step 316 to determine characteristics related to the cantilever 100. The characteristic vibration frequency of a harmonic oscillator such as the cantilever 100 depends in a well known manner upon (i) the overall geometry of the cantilever 100, such as its length, width and thickness (or the thickness of each of its layers if it is a layered-material strip), (ii) the Young's modulus of its constituent material (or materials), (iii) the density of its constituent material(s), and (iv) the strip's moment(s) of inertia. If some of these characteristics are known, then measuring the vibration frequency can be used to extract an unknown characteristic.

Figure 4A:
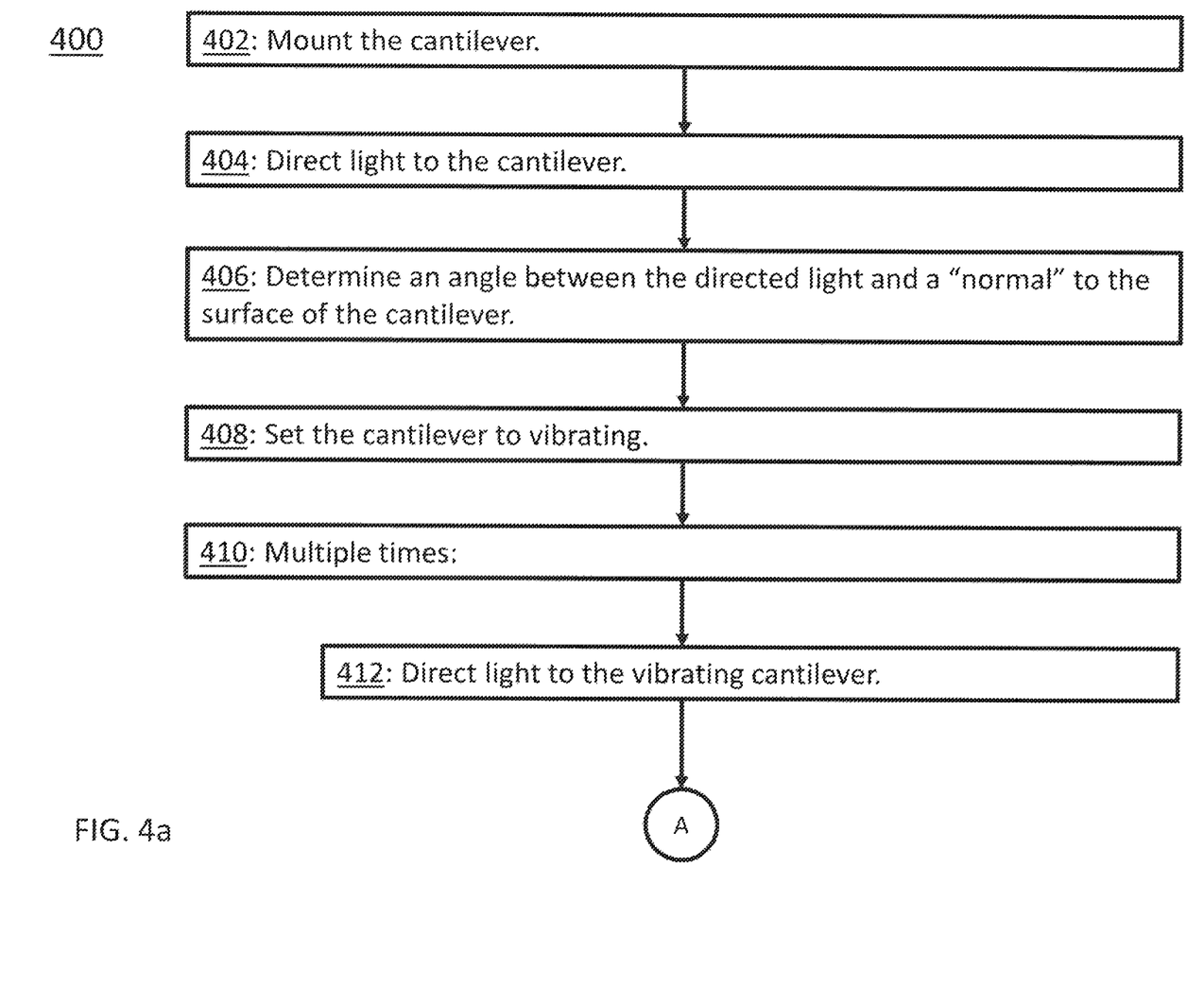
FIGS. 4a and 4b together form a flowchart of a method for measuring a vibration amplitude of a cantilever.
Figure 4B:
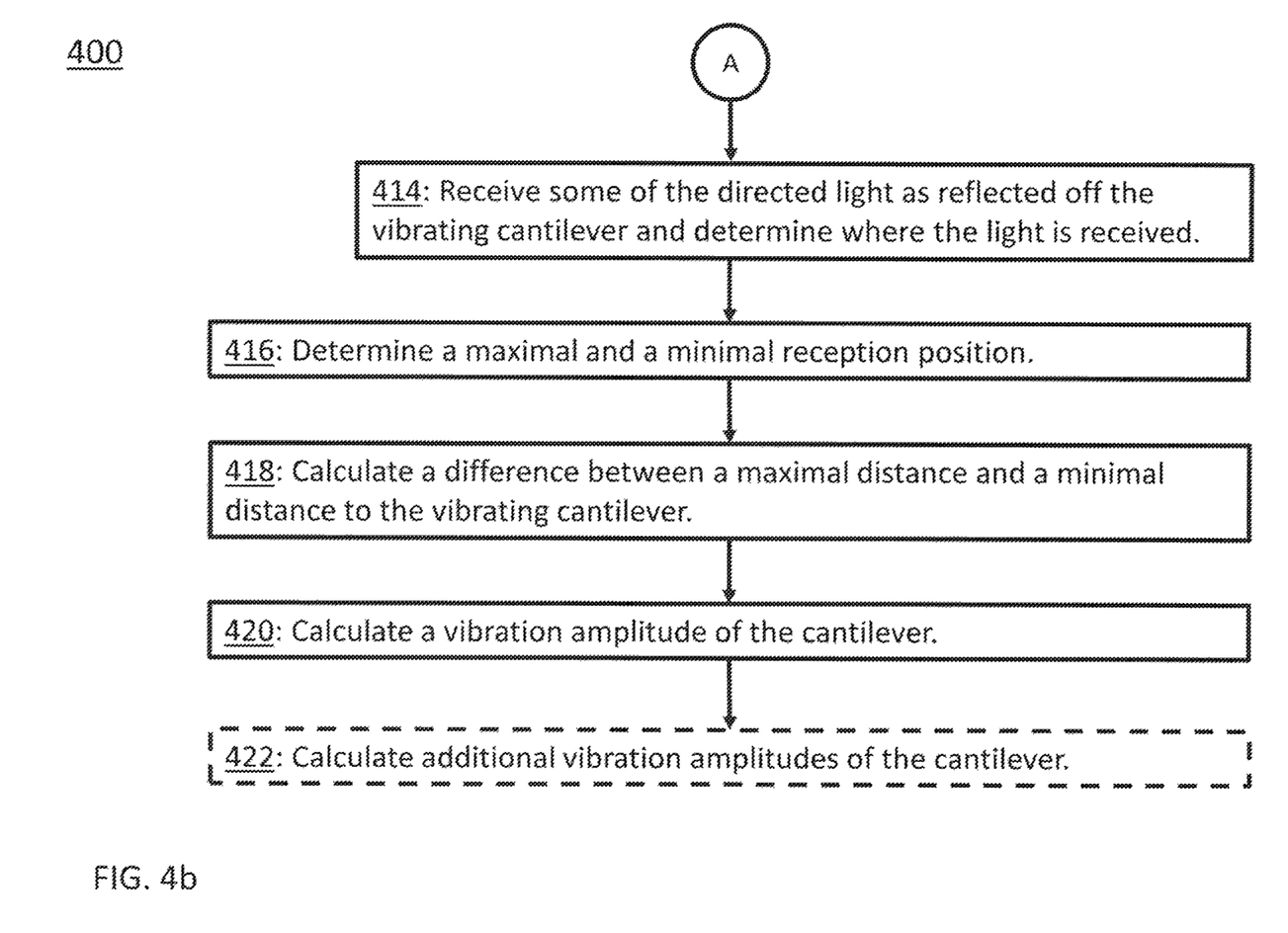

The method 400 of FIGS. 4a and 4b measures an amplitude of vibration of a cantilever 100. The method begins in step 402 when the cantilever 100 is placed in the mount 204.

In step 404, possibly under the control of the computer 220, the laser (or other light source) 208 directs collimated light 210 toward the not-yet-vibrating cantilever 100. The angle θ between the directed light 210 and the normal 206a,c to the cantilever 100 in its midpoint position is set or is measured in step 406. In some situations, the angle θ is set to be as large as possible within the constraints of the system 200. Here, generally speaking, "large" means greater than 45 degrees which gives angle θ a tangent greater than 1. A "large" angle θ tends to increase the accuracy of the deflection measurement as discussed below.

There are a few possible alternatives at play in the method 400. In one alternative, the light 210 reflected off the cantilever 100 at rest hits the position-sensitive light detector 212 at position 214a,c, and that position 214a,c is recorded for later use. While useful, this information is not strictly necessary, as some alternatives make do without this static measurement.

The cantilever 100 is set to vibrating in step 408. While a classical harmonic oscillator may have a characteristic frequency, it does not have a characteristic amplitude: The initial amplitude of the vibrating cantilever 100 is determined by how hard it is initially "hit."

The deflection 106 of the cantilever 100 due to its vibration is repeatedly measured in the loop of step 410. To measure the deflection 106, light 210 is directed toward the cantilever 100 in step 412. The light 210 reflects off the cantilever 100 in step 414 of FIG. 4b and hits the position-sensitive light detector 212 which reports the position of light reception 214b,e. Note that the deflection 106 of the cantilever 100 goes from positive to negative and back again as the cantilever 100 oscillates. The geometry of negative deflections 106 is not shown in FIGS. 2b, 2d, and 2e but is easy enough to derive from these figures.

For the midpoint distance (a), the mathematics are the same for the top-clamp implementation of FIG. 2a and the side-clamp implementation of FIG. 2c. Let the distance from the light-reception position 214a,c along the baseline 216 to the baseline-crossing position 218 be denoted by "X(mid)," and let the distance along the normal 206a,c from the baseline 216 to the cantilever 100 at midpoint be denoted by "Y(mid)," then it is clear that:

$$\tan(\theta)=X(\text{mid})/(2*Y(\text{mid}))$$

$$Y(\text{mid})=X(\text{mid})/(2*\tan(\theta)) \qquad \text{Equation 2}$$

The mathematics for the maximally deflected distance (b) differ between the top-clamp implementation of FIG. 2b and the side-clamp implementation of FIG. 2e. For the top-clamp implementation, let the distance from the light-reception position 214b to the baseline-crossing position 218 be denoted by "X(max-top)," and the distance from the baseline 216 to the maximally deflected cantilever 100 be denoted by "Y(max-top)," then it is clear that:

$$\tan(\theta)=X(\text{max-top})/(2*Y(\text{max-top}))$$

$$Y(\text{max-top})=X(\text{max-top})/2*\tan(\theta)) \qquad \text{Equation 3}$$

As the maximum deflection 106 is simply the difference in distances, combining Equations 2 and 3 yields the maximum deflection 106 caused by the vibration:

$$\text{maximum deflection } 106 = Y(\text{mid}) - Y(\text{max-top}) = (X(\text{mid}) - X(\text{max-top}))/(2*\tan(\theta)) \qquad \text{Equation 4}$$

Note that the maximum deflection 106 can be calculated directly without the intermediate step of calculating either distance. Note also that the larger the angle θ, the larger are both the numerator and denominator in Equation 4; the division of two larger numbers possibly giving more accuracy than the division of two smaller numbers.

For the side-clamp implementation of FIG. 2e, if the tilt angle α is ignored (which is often reasonable), then the deflected distance calculation is the same as the top-clamp implementation, and the maximum deflection 106 is given by Equation 4.

Accounting for the tilt angle α makes the mathematics for the side-clamp implementation of FIG. 2e lust a little trickier. Let the distance from the maximally deflected quasi-normal 206d along the baseline 216 to the baseline-crossing position 218 be "x(1)," the distance from the quasi-normal 206d along the baseline 216 to the light-reception position 214e be "x(2)," and the sum of these two be "X(max-side)." That is:

$$x(1)+x(2)=X(\text{max-side})$$

Denote the distance from the baseline 216 to tine maximally deflected target 100 by "Y(max-side)." Then it can be shown that:

$$\tan(\theta)=x(1)/Y(\text{max-side})$$

$$\tan(\theta+2*\alpha)=x(2)/Y(\text{xx-side})$$

$$Y(\text{max-side})=X(\text{max-side})/(\tan(\theta+2*\alpha)+\tan(\theta)) \qquad \text{Equation 5}$$

Combining Equation 5 with the midpoint distance of Equation 2 gives:

maximum deflection $106=Y(\text{mid})-Y(\text{max-side})=X(\text{mid})/(2*\tan(\theta))-X(\text{max-side})/(\tan(\theta+2*\alpha)+\tan(\theta))$  Equation 6

Then apply the small-angle approximation to eliminate α using Equation 1 and a measured distance 108 from the damping point 102 to the point on the maximally deflected cantilever 100 where the light reflects off it. This gives a solvable formula with only one unknown, the maximum deflection 106. (Note that Equation 6 reduces to Equation 4 as α approaches 0.)

As mentioned above, a calculation of the deflection 106 based purely on the shift in the quasi-normal 206d sometimes produces a result accurate enough for the following processing (in step 422). In particular, a limitation in the precision of the output 214e of the position-sensitive light detector 212 may render the refinement based on the tilt angle α meaningless. If, however, the output 214 of the position-sensitive light detector 212 is quite precise, then the more accurate result of Equation 6 may be useful.

Step 420 uses the calculated maximum deflection 106 as the amplitude of vibration at the distance 108 from the clamping point 102. In some situations, a cantilever 100 can be simultaneously vibrating at multiple amplitudes, and those multiple amplitudes are extractable from the light-reception data 214 by the computer 220 using a Fast Fourier Transform.

Note that during the loop of step 410, as the amplitude of vibration is repeatedly measured, the cantilever 100 is losing energy which decreases the amplitude of its vibration. Thus, the series of measurements gradually decrease, and the most relevant data pare usually the ones that come first.

The amplitude of vibration can then be used in step 422 to calculate other characteristics of the cantilever 100. If, for example, the material characteristics of the cantilever 100 are all known, then the method 400 can be used to calculate the force of the initial "hit" that set the cantilever 100 to vibrating in step 408. If, on the other hand, that force is already known, then it can be used along with the measured amplitude to calculate a material characteristic of the cantilever. The discussion of step 316 above is applicable here as well: The mathematics of the interactions of the characteristics of harmonic oscillators with their environments are well known, allowing unknown characteristics to be calculated based on known characteristics, including responses to inputs such as vibration frequencies, impulses, and vibration amplitudes.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entireties or alternatively to provide she disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for determining one or more vibration frequencies of a single cantilever, the method comprising:
   over a period of time, repeating the steps of:
      directing a fixed source of collimated light set at a known angle toward the single cantilever;
      receiving some of the directed light as reflected from the cantilever;
      determining a position where the reflected light is received; and
      for each of at least some of determined reception positions, associating a time of reception with the determined reception position; and
   based, at least in part, on at least some of the associated times of reception, calculating said one or more vibration frequencies of the cantilever;
   wherein the cantilever is a layered-material strip; and
   based, at least in part, on the calculated one or more vibration frequencies of the layered-material strip, determining a characteristic related to the layered-material strip.

2. The method for determining one or more vibration frequencies of a cantilever of claim 1 wherein directing collimated first light comprises directing laser light.

3. The method for determining one or more vibration frequencies of a cantilever of claim 1 further comprising:
   based, at least in part, on a Fast Fourier Transform applied to at least some of the associated times of reception, calculating a plurality of frequencies of vibration of the cantilever.

4. The method for determining a frequency of vibration of a cantilever of claim 1 wherein the determined characteristic is selected from the group consisting of: a Young's modulus of a material in the layered-material strip, a density of a material in the layered-material strip, a moment of inertia of a material in the layered-material strip, and a thickness of a material in the layered-material strip.

5. The method for determining one or more vibration frequencies of a cantilever of claim 1 wherein the layered-material strip comprises at least two different layers, a substrate and a coating applied on said substrate.

6. A method for determining an amplitude of vibration of a single cantilever, the method comprising: directing a fixed source of collimated light set at a known angle toward the single cantilever; determining an angle between the directed light and a normal to the cantilever;
   wherein determining the angle comprises setting the angle to be as large as possible;
   wherein large means greater than 45 degrees and providing a tangent greater than 1, increasing the accuracy of the deflection measurement;
   setting the cantilever to vibrating;
   over a period of time, repeating the steps of:
   directing a fixed source of, collimated light set at a known angle toward the single cantilever;
   receiving some of the directed light as reflected from the cantilever; and
   determining a reception position where the reflected light is received;
   from the determined reception positions, finding a maximal and a minimal determined reception position;
   based, at least in part, on the determined angle and on the maximal and minimal determined reception positions, calculating a difference between a maximal distance along the normal to the cantilever and a minimal distance along the normal to the cantilever;
   based, at least in part, on the calculated distance difference, calculating a vibration amplitude of the cantilever; and
   based, at least in part, on the calculated amplitude of vibration, determining a characteristic of the cantilever.

7. The method for determining an amplitude of vibration of a cantilever of claim 6 wherein directing collimated first light comprises directing laser light.

8. The method for determining a plurality of amplitudes of vibration of a cantilever of claim 6 further comprising:
   based, at least in part, on the determined angle and on a Fast Fourier Transform applied to at least some of the determined reception positions, calculating a plurality of amplitudes of vibration of the cantilever.

9. A system for determining one or more vibration frequencies of a single cantilever, the system comprising:
   a fixed source of directed collimated light set at a known angle;
   a mount configured for holding the cantilever;
   a position-sensitive light detector configured for receiving the directed light as reflected from the cantilever and for determining a position where the light is received;
   a timing device configured for associating a time of reception with a determined reception position; and
   a computing device configured for:
   based, at least in part, on at least some of the associated times of reception, calculating one or more vibration frequencies of the cantilever; wherein the cantilever is a layered-material strip; and
   wherein the computing device is further configured for:
      based, at .least in part, on the calculated one or more vibration frequencies of the layered-material strip, determining a characteristic related to the layered-material strip.

10. The system for determining one or more vibration frequencies of a cantilever of claim 9 wherein the computing device is further configured for:
   based, at least in part, on a Fast Fourier Transform applied to at least some of the associated times of reception, calculating a plurality of frequencies of vibration of the cantilever.

11. The system for determining one or more vibration frequencies of a cantilever of claim 9 further comprising:
   a vibration-isolation device.

12. The system for determining one or more vibration frequencies of a cantilever of claim 9 wherein the determined characteristic is selected from the group consisting of: a Young's modulus of a material in the layered-material strip, a density of a material in the layered-material strip, a moment of inertia of a material in the layered-material strip, and a thickness of a material in the layered-material strip.

13. The system for determining one or more vibration frequencies of a cantilever of claim 9 wherein the layered-material strip comprises at least two different layers, a substrate and a coating applied on said substrate.

14. A system for determining an amplitude of vibration of a single cantilever, the system comprising:
   a fixed source of directed collimated light set at a known angle; wherein a determined angle is set with a rotating platform to be as large as possible; wherein large means greater than 45 degrees and providing a tangent greater than 1, increasing the accuracy of the deflection measurement,
   the rotating platform configured for adjusting said angle between the directed light and a normal to the cantilever and for determining the angle;

said platform having a mount configured for holding the cantilever;

a position-sensitive light detector configured for receiving the directed light as reflected from the cantilever and for determining a position where the light is received; and a computing device configured for:

from a set of determined reception positions taken over a period of time, finding a maximal and a minimal determined reception position;

based, at least in part, on the determined angle and on the maximal and minimal determined reception positions;

calculating a difference between a maximal distance from the baseline to the cantilever and a minimal distance from the baseline to the cantilever;

based, at least in part, on the calculated distance difference, calculating a vibration amplitude of the cantilever; and based, at least in part, on the calculated amplitude of vibration, determining a characteristic of the cantilever.

15. The system for determining an amplitude of vibration of a cantilever of claim 14 wherein the source of collimated light is a laser.

16. The system for determining a plurality of amplitudes of vibration of a cantilever of claim 14 wherein the computing device is further configured for:

based, at least in part, on the determined angle and on a Fast Fourier Transform applied to at least some of the determined reception positions, calculating a plurality of amplitudes of vibration of the cantilever.

* * * * *